US009593785B2

(12) United States Patent
Koehler et al.

(10) Patent No.: US 9,593,785 B2
(45) Date of Patent: Mar. 14, 2017

(54) CONNECTION METHOD FOR A BRAIDED HOSE

(71) Applicant: Dr. Ing. h.c. F. Porsche Aktiengesellschaft, Stuttgart (DE)

(72) Inventors: Norman Koehler, Haldensleben (DE); Ralph Renz, Sindelfingen (DE); Philipp Scheiner, Eibelstadt (DE); Jens Bohlien, Stuttgart (DE); Marco Geuther, Langenau (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 139 days.

(21) Appl. No.: 14/626,994

(22) Filed: Feb. 20, 2015

(65) Prior Publication Data

US 2015/0233500 A1  Aug. 20, 2015

(30) Foreign Application Priority Data

Feb. 20, 2014 (DE) ........................ 10 2014 102 199

(51) Int. Cl.
*F16L 13/10* (2006.01)
*F16B 11/00* (2006.01)
*B23K 31/02* (2006.01)
*B29C 65/48* (2006.01)
*B29L 23/00* (2006.01)
(Continued)

(52) U.S. Cl.
CPC .......... *F16L 13/103* (2013.01); *B23K 31/027* (2013.01); *F16B 11/006* (2013.01); *B29C 65/48* (2013.01); *B29C 65/4835* (2013.01); *B29C 66/1122* (2013.01); *B29C 66/5344* (2013.01); *B29C 66/53241* (2013.01); *B29C 66/72141* (2013.01); *B29C 66/81455* (2013.01); *B29K 2105/0827* (2013.01); *B29L 2023/005* (2013.01); *F16L 11/085* (2013.01)

(58) Field of Classification Search
CPC .................................................... F16L 13/103
USPC ................................. 156/156, 293, 294, 287
See application file for complete search history.

(56) References Cited

U.S. PATENT DOCUMENTS

| 5,501,248 A | * | 3/1996 | Kiest, Jr. ................. D04B 1/02 138/123 |
| 6,152,184 A | | 11/2000 | Kamiyama et al. |
| 2006/0254711 A1 | | 11/2006 | Schwert |

FOREIGN PATENT DOCUMENTS

| AT | 412015 | 8/2004 |
| DE | 3512988 | 10/1986 |

(Continued)

OTHER PUBLICATIONS

Machine Translation of Japanese Patent Publication 2000-161585, Date Unknown.*
Translation of Office Action Dated Jan. 27, 2016.

*Primary Examiner* — Jeff Aftergut
(74) *Attorney, Agent, or Firm* — Gerald E. Hespos; Michael J. Porco; Matthew T. Hespos

(57) ABSTRACT

A method is provided for connecting a tubular structural element to a braided hose. The method includes placing the braided hose in the tubular structural element, placing a blow hose in the braided hose and applying internal pressure to expand the braided hose into contact with the tubular structural member. Heat then is applied to cure an adhesion promoter to achieve a positive materially integral connection of the braided profile to the tubular structural member.

10 Claims, 5 Drawing Sheets

(51) Int. Cl.
*B29K 105/08* (2006.01)
*B29C 65/00* (2006.01)
*F16L 11/08* (2006.01)

(56) References Cited

FOREIGN PATENT DOCUMENTS

| | | | |
|---|---|---|---|
| DE | 10112049 | | 11/2001 |
| DE | 69916681 | | 4/2005 |
| JP | H01135991 A | | 5/1989 |
| JP | H0326522 A | | 2/1991 |
| JP | H08277967 A | | 10/1996 |
| JP | 2000-161585 A | * | 6/2000 |
| JP | 2012131218 A | | 7/2012 |

* cited by examiner

Fig. 1.1

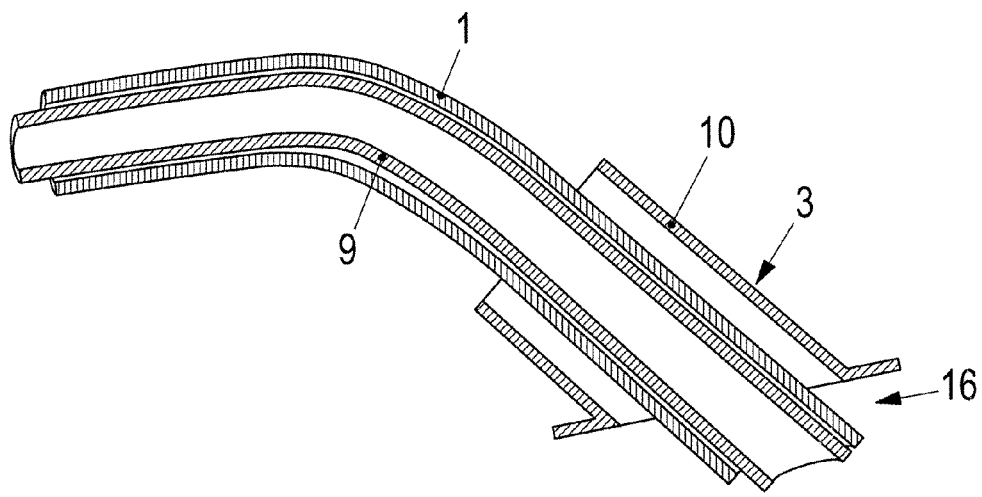
Fig. 3
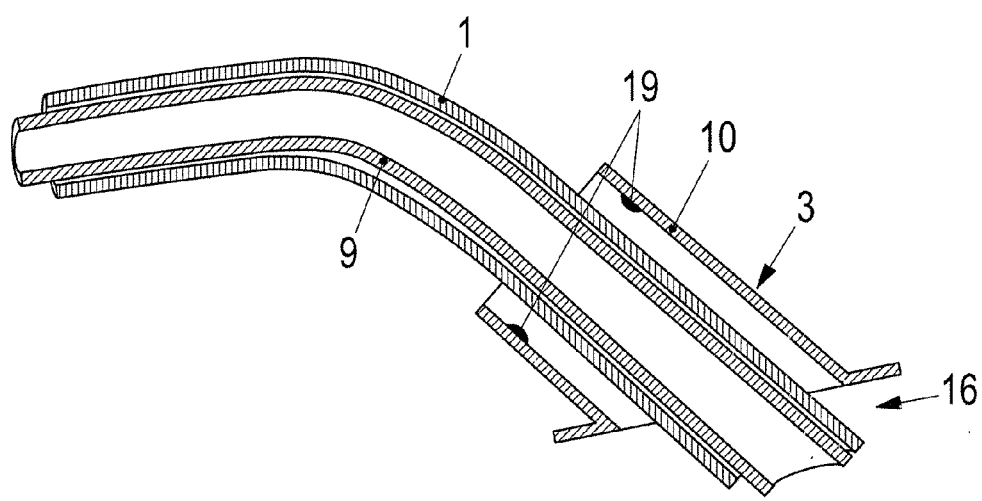
Fig. 3.1

CONNECTION METHOD FOR A BRAIDED HOSE

CROSS REFERENCE TO RELATED APPLICATION

This application claims priority under 35 USC 119 to German Patent Appl. No. 10 2014 102 199.1 filed on Feb. 20, 2014, the entire disclosure of which is incorporated herein by reference.

BACKGROUND

1. Field of the Invention

The invention relates to a connection method for a braided hose.

2. Description of the Related Art

DE 35 12 988 A1 discloses a method that uses an adhesive made from a vulcanized material for connecting a flexible hose to a rigid tube. Furthermore, DE 101 12 049 A1 discloses a device for gluing together two components that are pressed down on one side by a blow body capable of being acted upon with pressure.

The object of the invention to provide a connection method for a braided hose and a connection between a braided hose and a tie-up bracket or a metallic hollow profile, thus ensuring a simple way of making a firm and durable connection.

SUMMARY OF THE INVENTION

The invention relates to a connection method for fastening a braided hose to a tie-up bracket or to a hollow profile. The method includes introducing a flexurally slack unconsolidated braided hose into the tie-up bracket or into the hollow profile and placing the assembly into a die. A blow hose that is capable of being acted upon with internal pressure is inserted temporarily into the die and is expanded radially. A positive connection takes place in the die as a result of a radial expansion of the braided hose up to the inner contour of the tie-up bracket or of the hollow profile. The method further includes introducing an adhesion promoter so that a materially integral connection between the braided hose and the tie-up bracket or the hollow profile is made as a result of curing of the adhesion promoter by supplying heat from the die. As a result of this procedure, the unconsolidated braided hose is connected to the tie-up bracket or to the hollow profile positively and in a materially integral manner in a plurality of method steps that may take place in succession and/or simultaneously.

The inside of the tie-up bracket may include projecting local embossings that are directed toward the braided hose and that penetrate into the braided hose in a latching manner in the connected state of the bracket to the braided hose. This penetration of the embossings into the braided hose forms an undercut for the braided hose.

The braided hose may comprise a hybrid yarn (synthetic fibers and reinforcing fibers), and the tie-up bracket is inserted with a free end or with a region in the flexurally slack unconsolidated state in a sleeve-shaped extension of the tie-up bracket or the braided hose is drawn into the hollow profile. In this state, the braided hose is placed into the die.

The braided hose is held positively in a state expanded by the blow hose, and a cured adhesion promoter composed of a 2-component adhesive secures the braided hose in a materially integrally manner in the tie-up bracket or the hollow profile. The internal pressure expands the temporarily inserted blow hose in the braided hose and the curable adhesion promoter in the die ensures a positive bearing contact against the tie-up bracket or the hollow profile to achieve a materially integral connection.

The tie-up bracket may be connected peripherally by a weld to a flanged plate that has an orifice for a protruding end of the inserted braided hose. The orifice in the flanged plate makes it possible to push the braided hose through before the connection method, so that, after cutting to length, the correct length in the sleeve-shaped receptacle of the tie-up bracket is achieved in the plane of the flanged plate.

The connection region of the braided hose to the hollow profile conforms to the profile shape of the metallic hollow profile. The profile shape conforms to the stipulated contour of the die in the free region outside the hollow profile. In the exemplary embodiment, the braided hose has a diameter that is larger than the diameter of the hollow profile. In contrast to the tie-up bracket, because of the profile shapes of the mutually opposite die halves on both sides of the metallic hollow profile, an undercut connection is achieved. Thus, the transmittable forces of the connection under loads arising in the direction of the profile axis are increased markedly.

An exemplary embodiment of the invention is illustrated in the drawings and is described in more detail below.

BRIEF DESCRIPTION OF THE DRAWINGS

FIG. 1.1 shows a sectional illustration through a version according to FIG. 1, with an embossing in the tie-up bracket, in a connection position.

FIG. 3 shows an illustration of the introduction of the braided hose into the tie-up bracket.

FIG. 3.1 shows an illustration of the version according to FIG. 3, with the embossing according to FIG. 1.1, in the tie-up bracket in a preconnection position.

DETAILED DESCRIPTION

A braided hose 1 is connected to a structural element composed of a tie-up bracket 3 or of a hollow profile 4 in a plurality of method steps that take place in succession and/or simultaneously in a die 2.

Figure 9:
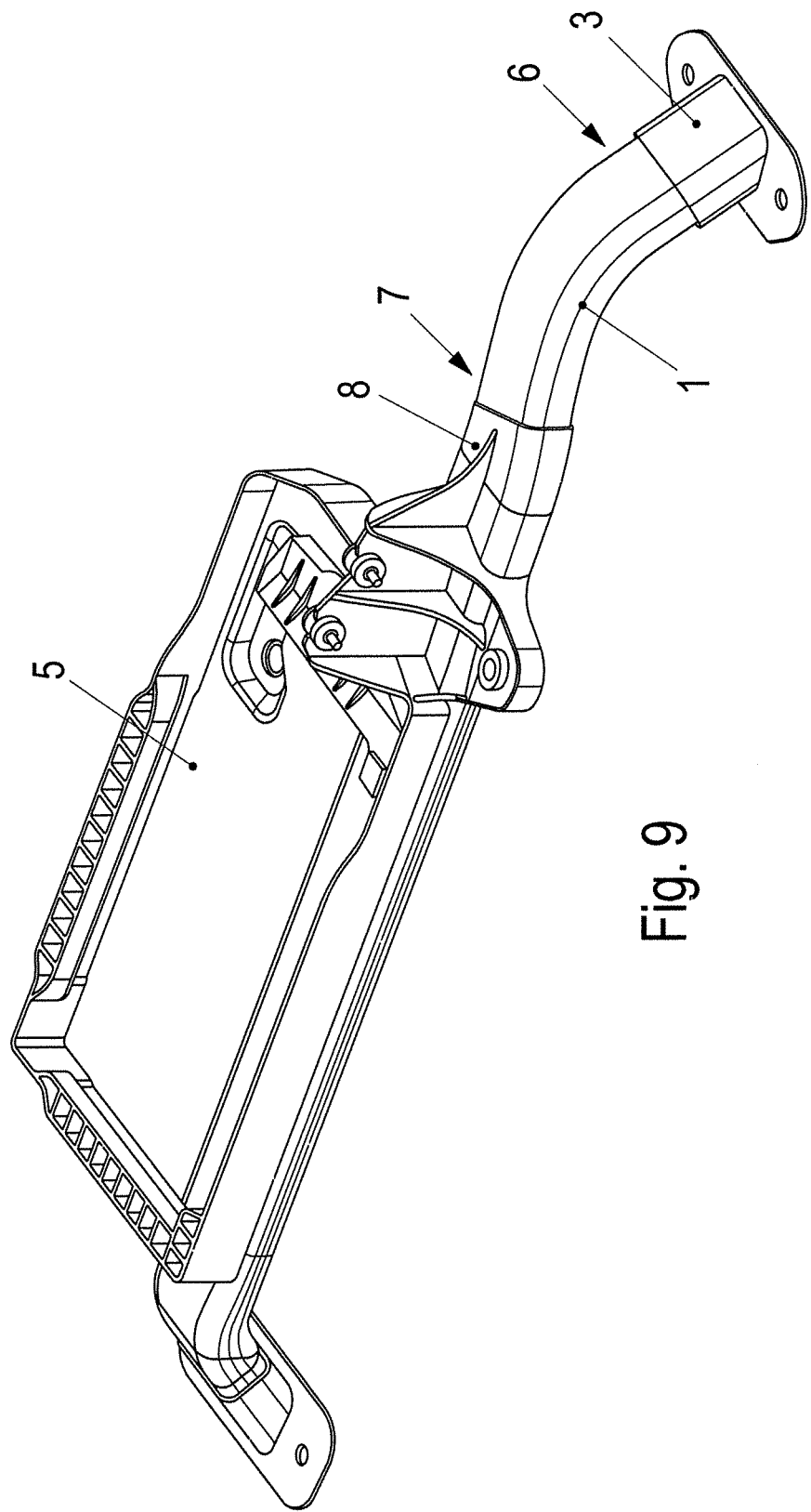
FIG. 9 shows an exemplary embodiment of a braided hose as a support for a battery carrier.

With reference to FIG. 9, the structural element preferably is tie-up bracket 3 used, for example, with a battery carrier 5 in a vehicle. The braided hose 1 has a first end 6 that is connectable to the tie-up bracket 3, and a second end 7 that is connectable to a holding bracket 8 of the battery carrier 5.

Figure 5:
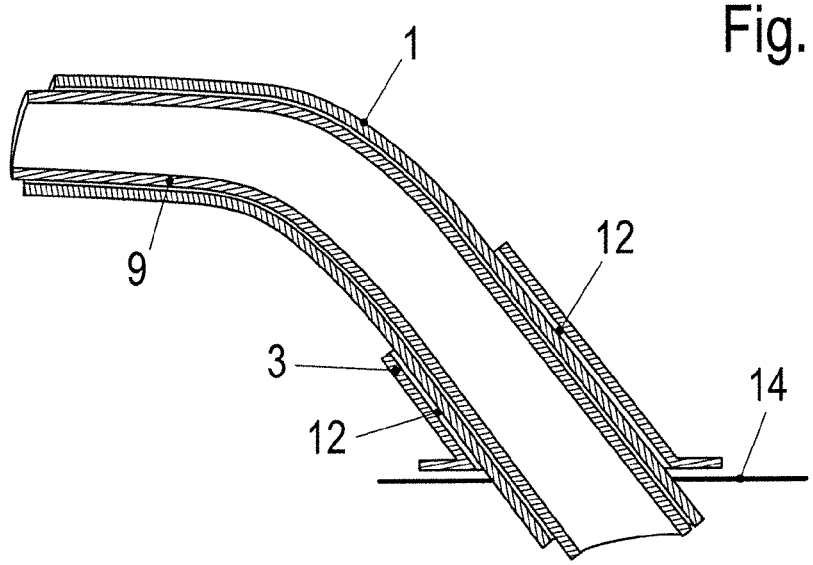
FIG. 5 shows an illustration with the introduction of an adhesion promoter.
Figure 6:
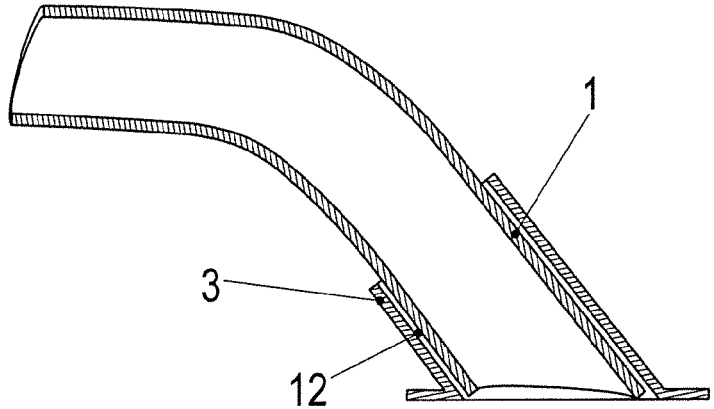
FIG. 6 shows an illustration of a braided hose, with the blow hose removed.
Figure 7:
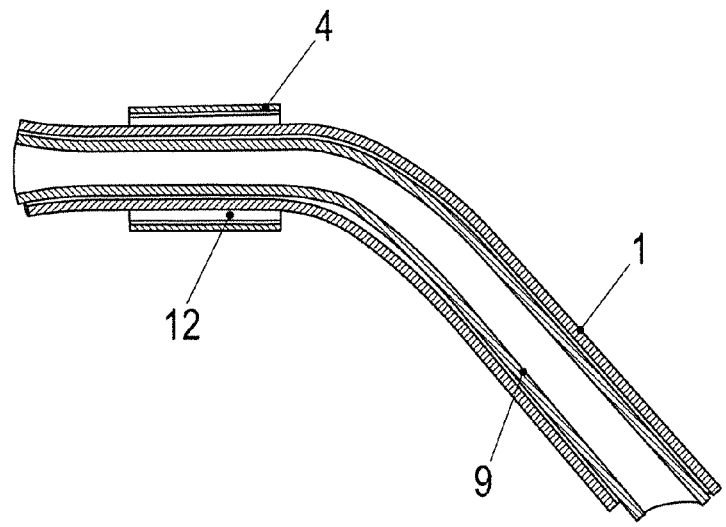
FIG. 7 shows an illustration of a further version with a braided hose connectable to a metallic hollow profile, in a preparatory position.
Figure 8:
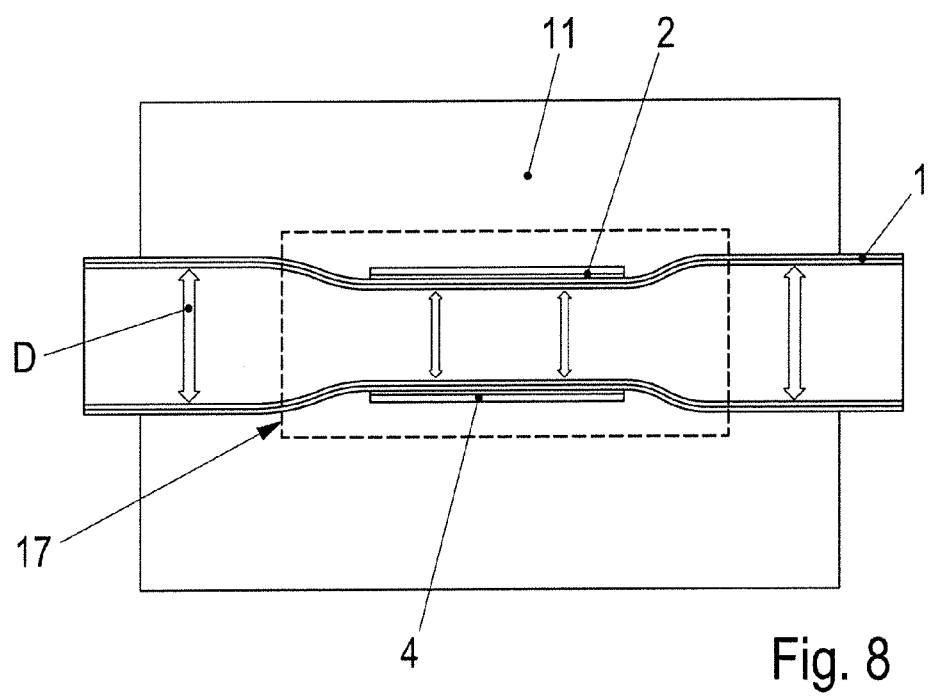
FIG. 8 shows an illustration of a die with an internally arranged braided hose connected to the hollow profile.

As is illustrated in FIGS. 1 to 5 for the tie-up bracket 3 and in FIGS. 6 and 7 for the exemplary embodiment of the hollow profile 4, the connection method for the tie-up bracket 3 and for the hollow profile 4 takes place essentially in identical simultaneous manufacturing steps, but with minor deviations on account of the different geometry of the hollow profile 4 from that of the tie-up bracket 3 being possible.

The manufacturing process to connect the tie-up bracket 3 to the braided hose 1, includes introducing a flexurally slack unconsolidated braided hose 1 into the tie-up bracket 3 and placing this assembly into the die. The method further includes inserting a blow hose 9 and applying an internal pressure D so that the braided hose 1 expands radially to achieve a positive connection in the die 2 up to the inner contour of the tie-up bracket 3. The method further includes introducing an adhesion promoter 12 between the tie-up bracket 3 and the braided hose 1 and curing of the adhesion promoter 12, for example by supplying heat via the die 2 to achieve a materially integral connection between the tie-up bracket 3 and the braided hose 1.

Figure 2:
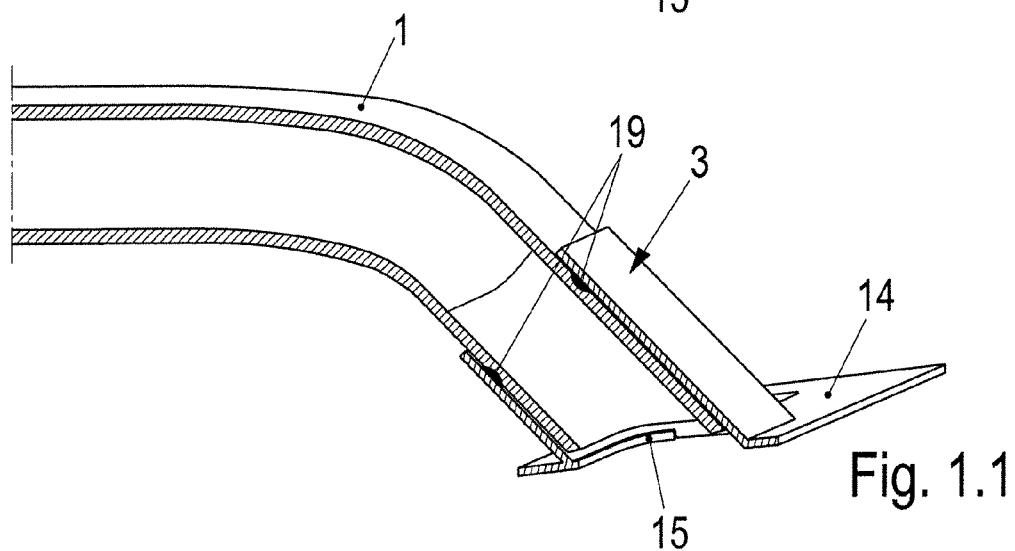
FIG. 2 shows an illustration for making of a connection between the braided hose and the tie-up bracket, with a drawn-in blow hose.
Figure 2:
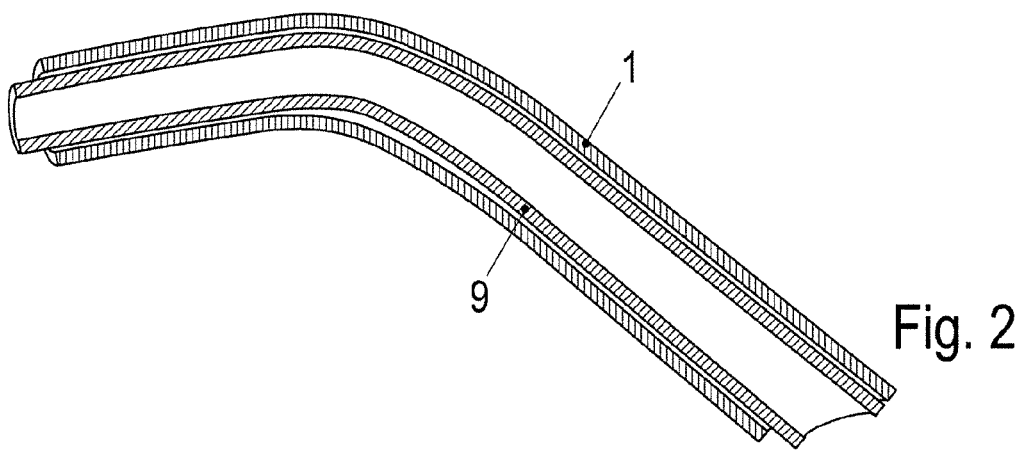
Figure 4:
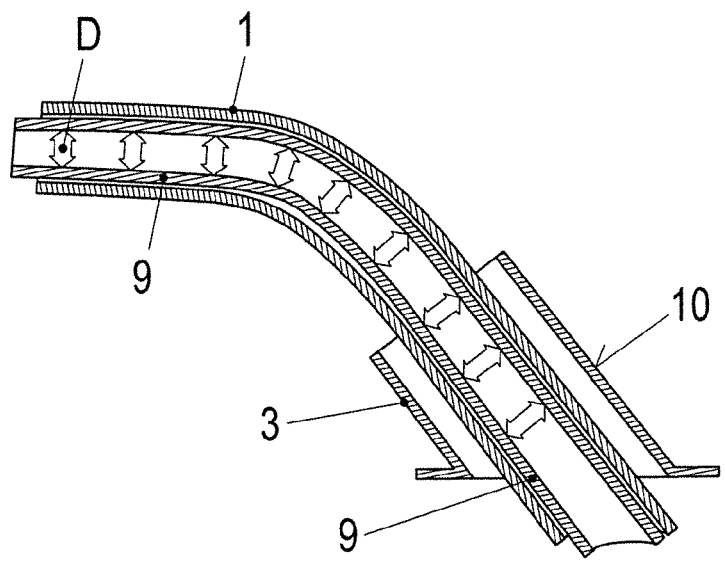
FIG. 4 shows an illustration with the blow hose acted upon by an internal pressure.

As shown in FIG. 2, a blow hose 9 is introduced into the braided hose 1, then, as shown in FIG. 3, the braided hose 1 is inserted together with the internal blow hose 9 into the sleeve-shaped portion 10 of the tie-up bracket 3, and the die 2 surrounds this unit, as illustrated in more detail for this version. Thereafter, the blow hose 9 is acted upon inside the braided hose 1 with an internal pressure D, as illustrated by the arrows. An adhesion promoter 12 is introduced between the tie-up bracket 3 and the braided hose 1, as shown in FIG. 5. The blow hose 9 then is removed from the consolidated braided hose 1, and the free protruding end is trimmed. The cut 18 is illustrated in more detail in FIG. 5.

Figure 1:
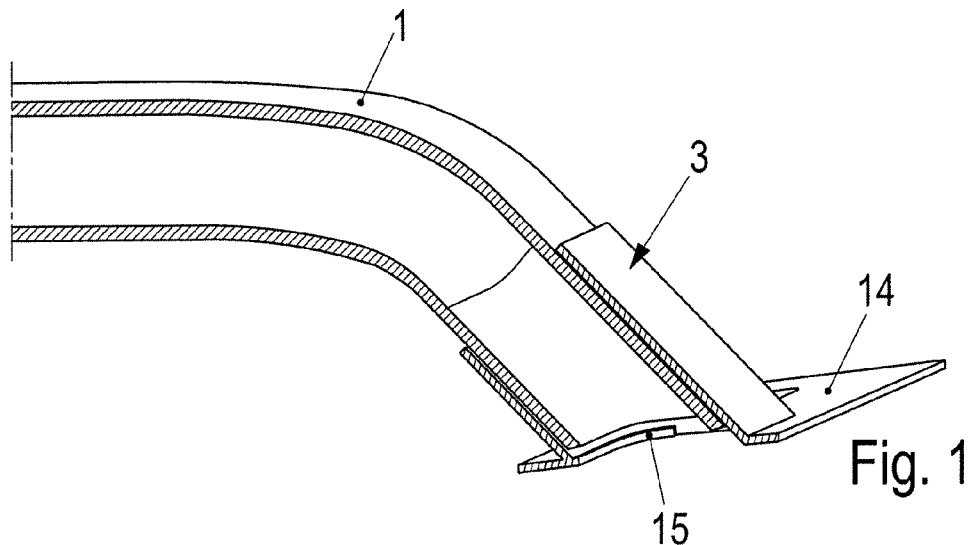
FIG. 1 is a sectional illustration through a tie-up bracket connected to a braided hose.

As illustrated in the embodiment of FIGS. 1.1 and 3.1, the inside of tie-up bracket 3 may have local embossings 19 directed toward the braided hose 1. The embossings 19 penetrate into the braided hose 1 in a latching manner, or the braided material of the hose 1 surrounds the local embossings 19 in the connected state of the tie-up bracket 3 to the braided hose 1. The local embossings 19 may be incorporated into the metallic profile of the tie-up bracket 3 by hammer blows or roll-profiling.

As a result, the metal of the bracket 3 is pressed slightly inward into the profile of the bracket 3 and forms what is known as a geometric undercut for the braided hose 1. What is not illustrated is a marking on the outside of the bracket 3 in the region of the embossing 19 arising due to the incorporation of the embossing 19.

The braided hose 3 preferably is a hybrid yarn, and the adhesion promoter preferably is formed from a 2-component adhesive.

The tie-up bracket 3 is connected peripherally by a weld to a flanged plate 14 that has an orifice 15 through which a protruding end 16 of the braided hose 1 projects. The connection process of the metallic hollow profile 4 connected to the braided hose 1 takes place essentially in a similar way to the connection of the braided hose 1 to the tie-up bracket 3. Thus, the metallic hollow profile 4 is pushed over the unconsolidated braided hose 1 and surrounds the braided hose 1 completely. The hollow profile 4 is placed together with the unconsolidated braided hose 1 into the die 2. The introduced adhesion promoter 12 is cured by supplying heat in the die 2. The hollow profile 4 is integrated into the process of manufacturing the braided hose 1, and the braided hose 1 locally copies the profile shape of the metallic hollow profile 4. The profile shape of the braided hose 1 may differ in the region of connection to the metallic hollow profile 4 from the profile shape in the free region. An undercut connection 17, as it is known, is thereby possible.

What is claimed is:

1. A method for connecting a free end region of a braided hose to a tubular structural element of a vehicle, comprising: introducing the free end region of the flexurally slack unconsolidated braided hose into the tubular structural element of a tie-up bracket while causing all parts of the braided hose extending from the free end region to project from the tubular structural element; inserting a blow hose into the braided hose; applying an internal pressure into the blow hose to radial expand the free end region of the braided hose into contact with the tubular structural element; applying heat for curing an adhesion promoter introduced between the free end region of the braided hose and the tubular structural element for achieving a materially integral connection between the free end region of the braided hose and the tubular structural element while parts of the braided hose adjacent the free end region project from the tubular structural element; and removing the blow hose from the braided hose.

2. The method of claim 1, wherein the braided hose is composed of a hybrid yarn.

3. The method of claim 1, wherein the adhesion promoter is a two-component adhesive.

4. The method of claim 1, wherein the tie-up bracket has a sleeve-shaped extension, and the step of inserting a free end region of the braided hose in the flexurally slack unconsolidated state into the tie-up bracket comprises inserting the free end region of the braided hose into the sleeve-shaped extension of the tie-up bracket.

5. The method of claim 4, further comprising welding the tie-up bracket to a flanged plate that has an orifice for accommodating a protruding end of the braided hose in a preparatory state.

6. The method of claim 1, wherein the free and region of the braided hose is adjacent a first free end region adjacent a first end of the braided hose, the braided hose further having a second end and a second free end region adjacent the second end, the method further comprising: introducing the second free end region of the flexurally slack unconsolidated braided hose into a second tubular structural element spaced from the tie-up bracket; inserting a blow hose into the braided hose; applying an internal pressure into the blow hose to radial expand the first and second end regions of the braided hose into contact with the tubular structural elements; applying heat for curing an adhesion promoter introduced between the free end regions of the braided hose and the tubular structural elements for achieving a materially integral connection between the free end regions of the braided hose and the tubular structural elements; and removing the blow hose from the braided hose.

7. A method for connecting a braided hose to a tubular structural element that defines a hollow profile, the method comprising: inserting an intermediate region of the braided hose in a flexurally slack unconsolidated state into the hollow profile; placing a region of the flexurally slack unconsolidated braided hose and the hollow profile into a die; inserting a blow hose into the braided hose; applying an internal pressure into the blow hose to radial expand the braided hose into contact with the hollow profile; applying heat to the die for curing an adhesion promoter introduced between the braided hose and the hollow profile for achieving a materially integral connection between the braided hose and the hollow; and removing the blow hose from the braided hose.

8. The method of claim 7, wherein the step of applying an internal pressure into the blow hose to radial expand the braided hose causes the braided hose to conform to a profile shape of the hollow profile and to conform to a profile shape of the die in free regions outside of the hollow profile, and wherein the braided hose has a diameter larger than a diameter of the hollow profile.

9. The method of claim 7, wherein the braided hose has, in the consolidated state, an undercut connection with the hollow profile.

10. A method for connecting a braided hose to a tubular structural element, comprising forming inwardly projecting local embossings in the tubular structural element; introducing a flexurally slack unconsolidated braided hose into the tubular structural element; inserting a blow hose into the braided hose; applying an internal pressure into the blow hose to radial expand the braided hose into contact with the tubular structural element and thereby causing the local embossings to penetrate into and latch the braided hose as the braided hose is expanded radially by the internal pressure applied into the blow hose; applying heat for curing an adhesion promoter introduced between the braided hose and the tubular structural element for achieving a materially integral connection between the braided hose and the tubular structural element; and removing the blow hose from the braided hose.

* * * * *